United States Patent
Akashi

(10) Patent No.: US 9,304,679 B2
(45) Date of Patent: Apr. 5, 2016

(54) ELECTRONIC DEVICE AND HANDWRITTEN DOCUMENT DISPLAY METHOD

(71) Applicant: KABUSHIKI KAISHA TOSHIBA, Tokyo (JP)

(72) Inventor: Aiko Akashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 535 days.

(21) Appl. No.: 13/762,756

(22) Filed: Feb. 8, 2013

(65) Prior Publication Data

US 2014/0118242 A1 May 1, 2014

(30) Foreign Application Priority Data

Oct. 26, 2012 (JP) ................................. 2012-236836

(51) Int. Cl.
G06F 3/041 (2006.01)
G06F 3/0488 (2013.01)

(52) U.S. Cl.
CPC .................................. *G06F 3/04883* (2013.01)

(58) Field of Classification Search
None
See application file for complete search history.

(56) References Cited

U.S. PATENT DOCUMENTS

| | | | |
|---|---|---|---|
| 5,572,651 A | 11/1996 | Weber et al. | |
| 6,373,473 B1 | 4/2002 | Sakaguchi et al. | |
| 7,093,202 B2 | 8/2006 | Saund et al. | |
| 7,158,675 B2 | 1/2007 | Gounares et al. | |
| 8,930,372 B2 | 1/2015 | Terui et al. | |
| 2003/0095113 A1 | 5/2003 | Ma | |
| 2010/0115450 A1* | 5/2010 | Scott et al. | 715/777 |

FOREIGN PATENT DOCUMENTS

| | | |
|---|---|---|
| JP | H05-303619 A | 11/1993 |
| JP | H07-057053 A | 3/1995 |
| JP | H07-182445 A | 7/1995 |
| JP | H07-302306 A | 11/1995 |
| JP | H09-091424 A | 4/1997 |
| JP | H09-319764 A | 12/1997 |
| JP | 10-124502 | 5/1998 |
| JP | H11-066238 A | 3/1999 |
| JP | 2003-228690 A | 8/2003 |
| JP | 2003-288545 A | 10/2003 |
| JP | 2003-295993 A | 10/2003 |
| JP | 2004-005656 A | 1/2004 |

(Continued)

OTHER PUBLICATIONS

First Office Action mailed by Japan Patent Office on Jul. 2, 2013 in the corresponding Japanese patent application No. 2012-236836—7 pages.

(Continued)

*Primary Examiner* — Nicholas Lee

(74) *Attorney, Agent, or Firm* — Knobbe, Martens, Olson & Bear LLP

(57) ABSTRACT

According to one embodiment, an electronic device includes a storage, a first display processor, an input module, and a second display processor. The storage is configured to store stroke information corresponding to a plurality of strokes. The first display processor is configured to display the plurality of strokes. The input module is configured to input a retrieve key for retrieval of the plurality of strokes. The second display processor is configured to display a enlarged or reduced display area including a stroke part, which is retrieved from the stroke information and corresponds to the retrieve key, and strokes other than the stroke part.

13 Claims, 16 Drawing Sheets

(56) References Cited

FOREIGN PATENT DOCUMENTS

| | | |
|---|---|---|
| JP | 2009-020689 A | 1/2009 |
| JP | 2009-205397 A | 9/2009 |
| JP | 2010-205290 A | 9/2010 |
| JP | 2011-215958 | 10/2011 |

OTHER PUBLICATIONS

Final Office Action mailed by Japan Patent Office on Dec. 3, 2013 in the corresponding Japanese patent application No. 2012-236836—10 pages.

* cited by examiner

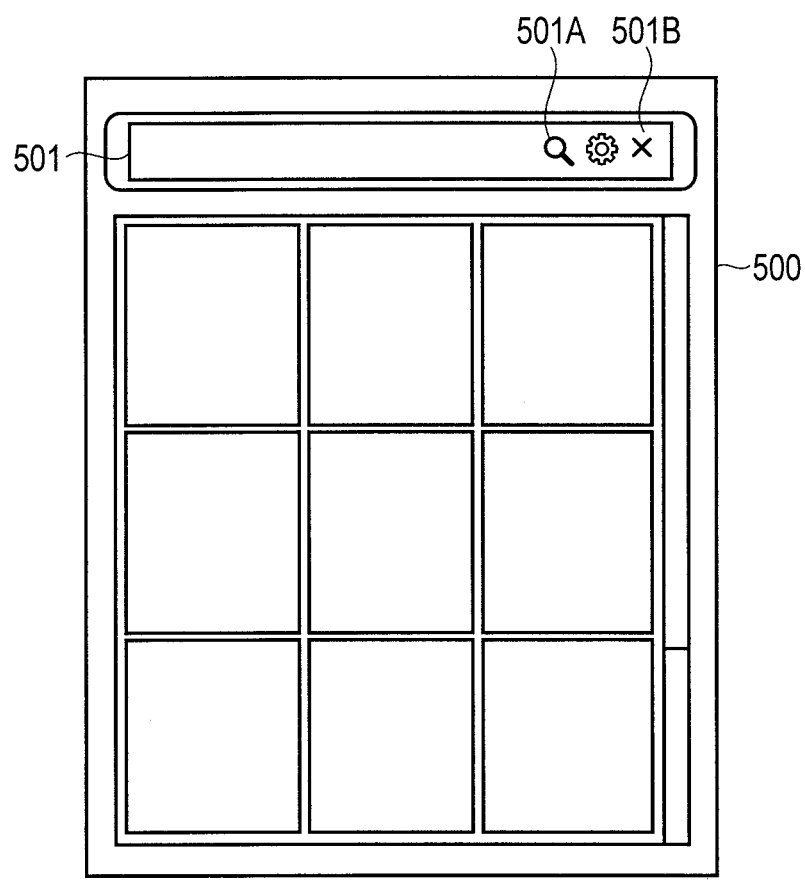
F I G. 5

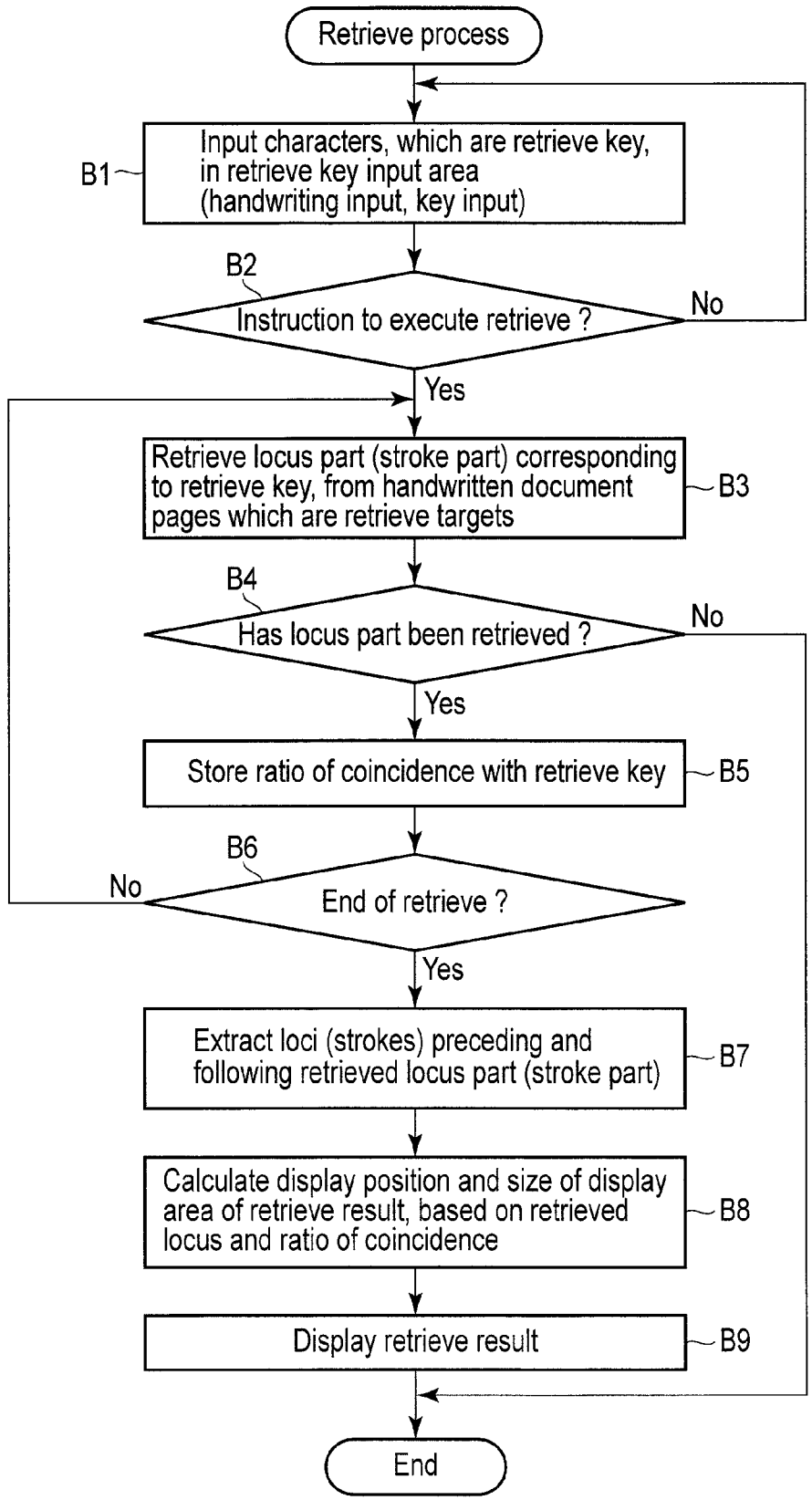
F I G. 6

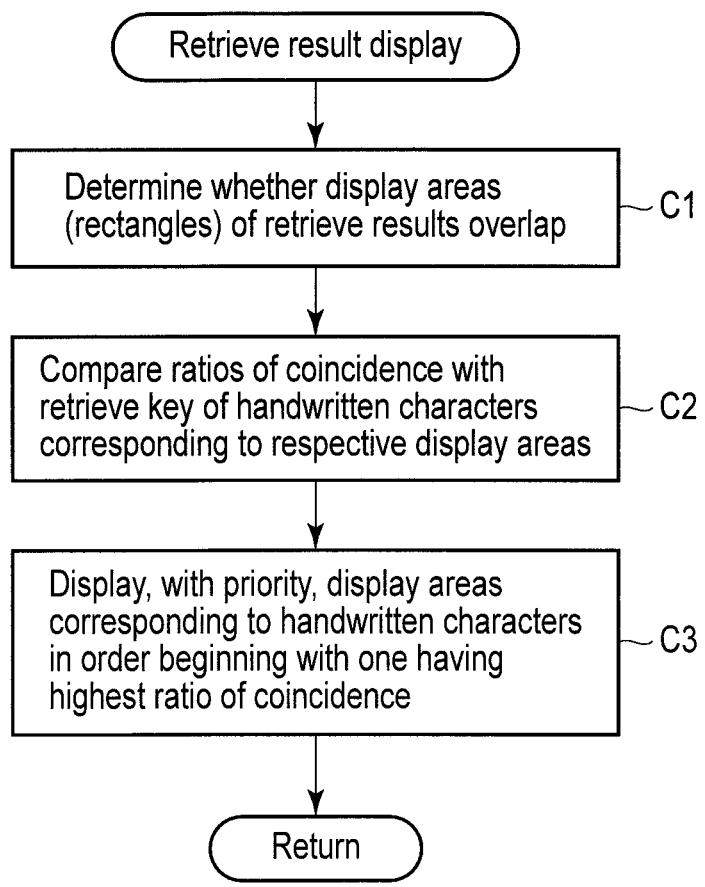
F I G. 7

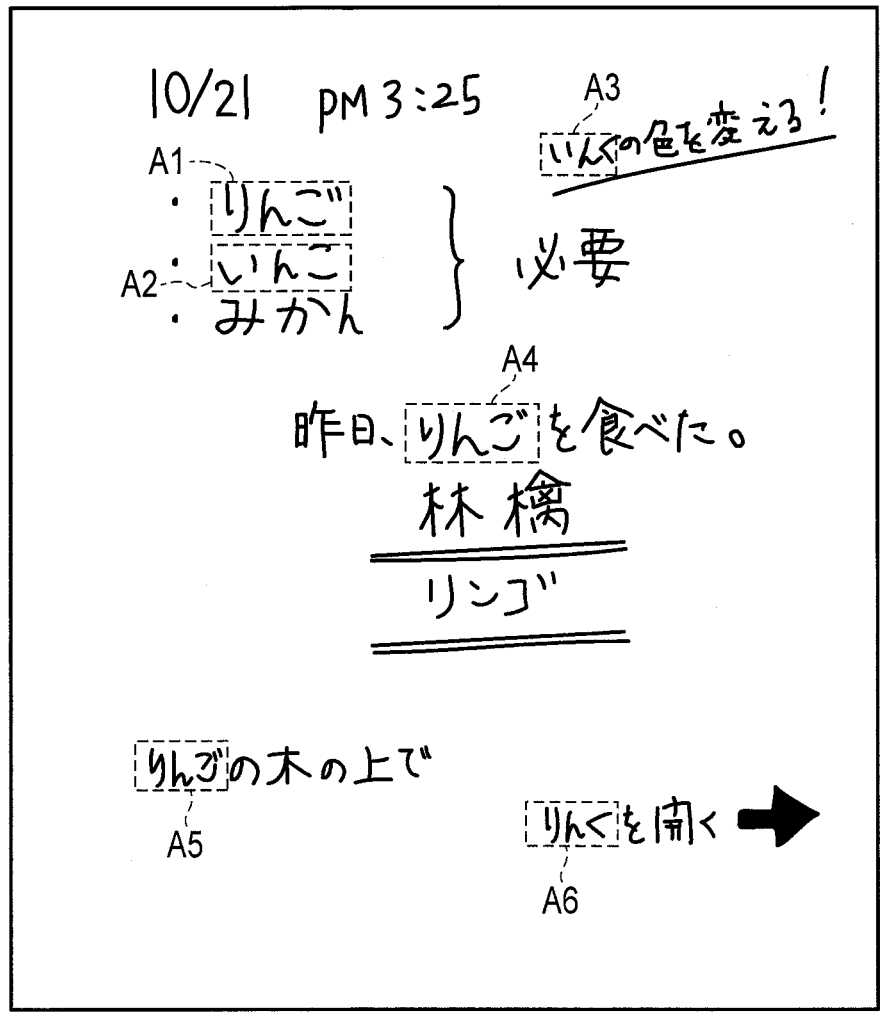
F I G. 9

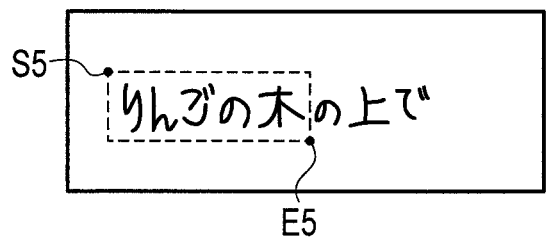
F I G. 1 3 A
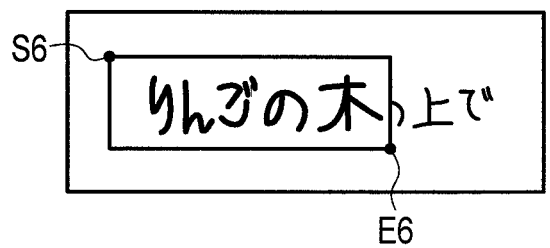
F I G. 1 3 B
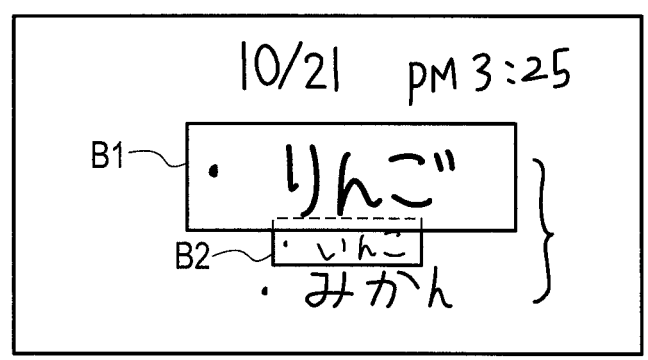
F I G. 1 4

ELECTRONIC DEVICE AND HANDWRITTEN DOCUMENT DISPLAY METHOD

CROSS-REFERENCE TO RELATED APPLICATIONS

This application is based upon and claims the benefit of priority from Japanese Patent Application No. 2012-236836, filed Oct. 26, 2012, the entire contents of which are incorporated herein by reference.

FIELD

Embodiments described herein relate generally to an electronic device which is capable of processing a handwritten document, a handwritten document display method which is used in the electronic device.

BACKGROUND

In recent years, various kinds of electronic devices, such as a tablet-type computer, a PDA (personal digital assistant) and a smartphone, have been developed. Most of these electronic devices include touch-screen displays for facilitating input operations by users.

By touching a menu or an object, which is displayed on the touch-screen display, by a finger or the like, the user can instruct a portable electronic device to execute a function which is associated with the menu or object.

However, most of existing electronic devices with touch-screen displays are consumer products which are designed to enhance operability on various media data such as video and music, and are not necessarily suitable for use in a business situation such as a meeting, a business negotiation or product development. Thus, paper-based pocket notebooks have still been widely used to record information by handwriting.

There are cases that electronic devices are expected to function as digital tools which can support a person's thinking activities or can make easier the re-use of materials such as documents which were created in the past. For example, such a function is expected that the electronic device can be used with the same feeling as a paper-based pocket notebook, and information recorded by handwriting can be easily browsed.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is a view illustrating an example of a retrieve screen which is presented to a user by the handwriting input program of the embodiment.

FIG. 6 is an exemplary flowchart illustrating a retrieve process of the embodiment.

FIG. 7 is an exemplary flowchart illustrating a retrieve result display process of the embodiment.

FIG. 9 is a view illustrating an example of one handwritten document page displayed on the retrieve screen in the embodiment.

FIG. 13A and FIG. 13B are view for explaining setting of a display area corresponding to a handwritten character string in the embodiment.

FIG. 14 is a view illustrating a display example of display areas in the embodiment.

DETAILED DESCRIPTION

Various embodiments will be described hereinafter with reference to the accompanying drawings.

In general, according to one embodiment, an electronic device comprises a storage, a first display processor, an input module, and a second display processor. The storage is configured to store stroke information corresponding to a plurality of strokes. The first display processor is configured to display the plurality of strokes, based on the stroke information. The input module is configured to input a retrieve key for retrieval of the plurality of strokes. The second display processor is configured to display a enlarged or reduced display area including a stroke part, which is retrieved from the stroke information and corresponds to the retrieve key, and strokes other than the stroke part.

Figure 1:
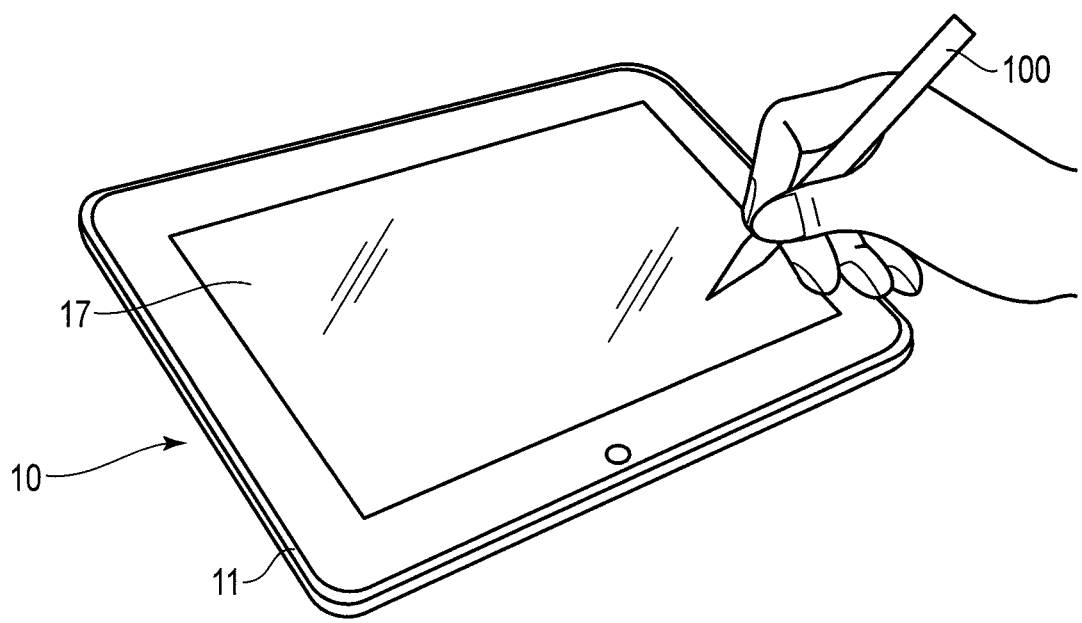
FIG. 1 is an exemplary perspective view illustrating an external appearance of an electronic device according to an embodiment.

FIG. 1 is a perspective view illustrating an external appearance of an electronic device according to an embodiment. The electronic device is, for instance, a portable electronic device which can input handwriting characters by a pen or a finger. This electronic device may be realized as a tablet computer, a notebook-type personal computer, a smartphone, a PDA, etc. In the description below, the case is assumed that this electronic device is realized as a tablet computer 10. The tablet computer 10 is a portable electronic device which is also called "tablet" or "slate computer". As shown in FIG. 1, the tablet computer 10 includes a main body 11 and a touch-screen display 17. The touch-screen display 17 is attached such that the touch-screen display 17 is laid over the top surface of the main body 11.

The main body 11 has a thin box-shaped housing. In the touch-screen display 17, a flat-panel display and a sensor (position detection device), which is configured to detect a position designated by a pen or a finger on the screen of the flat-panel display, are assembled. The flat-panel display may be, for instance, a liquid crystal display (LCD). As the sensor (position detection device), for example, use may be made of an electrostatic capacitance-type touch panel, or an electromagnetic induction-type digitizer, and the sensor detects a position touched by the pen or finger, or a nearby position thereof. In the description below, the case is assumed that two kinds of sensors, namely a digitizer and a touch panel, are both assembled in the touch-screen display 17.

Each of the digitizer and the touch panel is provided in a manner to cover the screen of the flat-panel display. The touch-screen display 17 can detect not only a touch operation on the screen with use of a finger, but also a touch operation on the screen with use of a pen 100. The pen 100 may be, for instance, an electromagnetic-induction pen. The user can execute a handwriting input operation on the touch-screen display 17 by using an external object (pen 100 or finger). If the handwriting input operation is performed on the touch-screen display 17, a locus of movement of the external object (pen 100 or finger) on the screen, that is, a locus (writing trace) of a stroke that is handwritten by the handwriting input operation, is displayed in real time. A locus of one stroke corresponds to a variation of a position (coordinates) which is in contact with the external object during a time in which the external object is in contact with the screen. Usually, a handwritten document is composed of a set of many strokes corresponding to handwritten characters or graphics, that is, a set of many loci (writing traces).

In the tablet computer 10 (electronic device) of the present embodiment, data of handwritten input strokes is stored in a storage medium not as image data but as time-series information (stroke information) which is indicative of coordinate data series indicative of the locus of each stroke and the order relation between the strokes. The time-series information means a set (stroke data series) of time-series coordinate data (coordinate data series) corresponding to a plurality of strokes. The order relation between strokes is indicative of an order in which the strokes were handwritten, that is, an order of strokes.

The tablet computer 10 can read out arbitrary existing time-series information from the storage medium, and display on the screen a handwritten document corresponding to this time-series information, that is, the loci corresponding to a plurality of strokes indicated by this time-series information. In addition, the tablet computer 10 includes a retrieve function of displaying a handwritten document including strokes (coordinate data series) corresponding to a retrieve key designated by the user. In the retrieve function, a locus part (stroke part), which corresponds to the stroke corresponding to the retrieve key and has been retrieved from the handwritten document, is displayed in an altered display mode which is different from a normal display mode.

Furthermore, the tablet computer 10 has an edit function. The edit function can delete or move an arbitrary stroke or an arbitrary handwritten character or the like in the displayed handwritten document, in accordance with an edit operation by the user with use of an "eraser" tool, a range designation tool, and other various tools. In addition, this edit function includes a function of clearing the history of some handwriting operations.

In this embodiment, the time-series information (handwritten document) may be managed as one page or plural pages. In this case, the time-series information (handwritten document) may be stored as one page corresponding to a piece of time-series information, which falls within one screen. Alternatively, the size of a page may be made variable. In this case, since the size of a page can be increased to an area which is larger than the size of one screen, a handwritten document of an area larger than the size of the screen can be handled as one page. When one whole page cannot be displayed on the display at a time, this page may be reduced in size and displayed, or a display target part in the page may be moved by vertical and horizontal scroll. In addition, a page may be reduced in size, so that a plurality of pages may be displayed in one screen at a time (display of a list of thumbnails).

Figure 2:
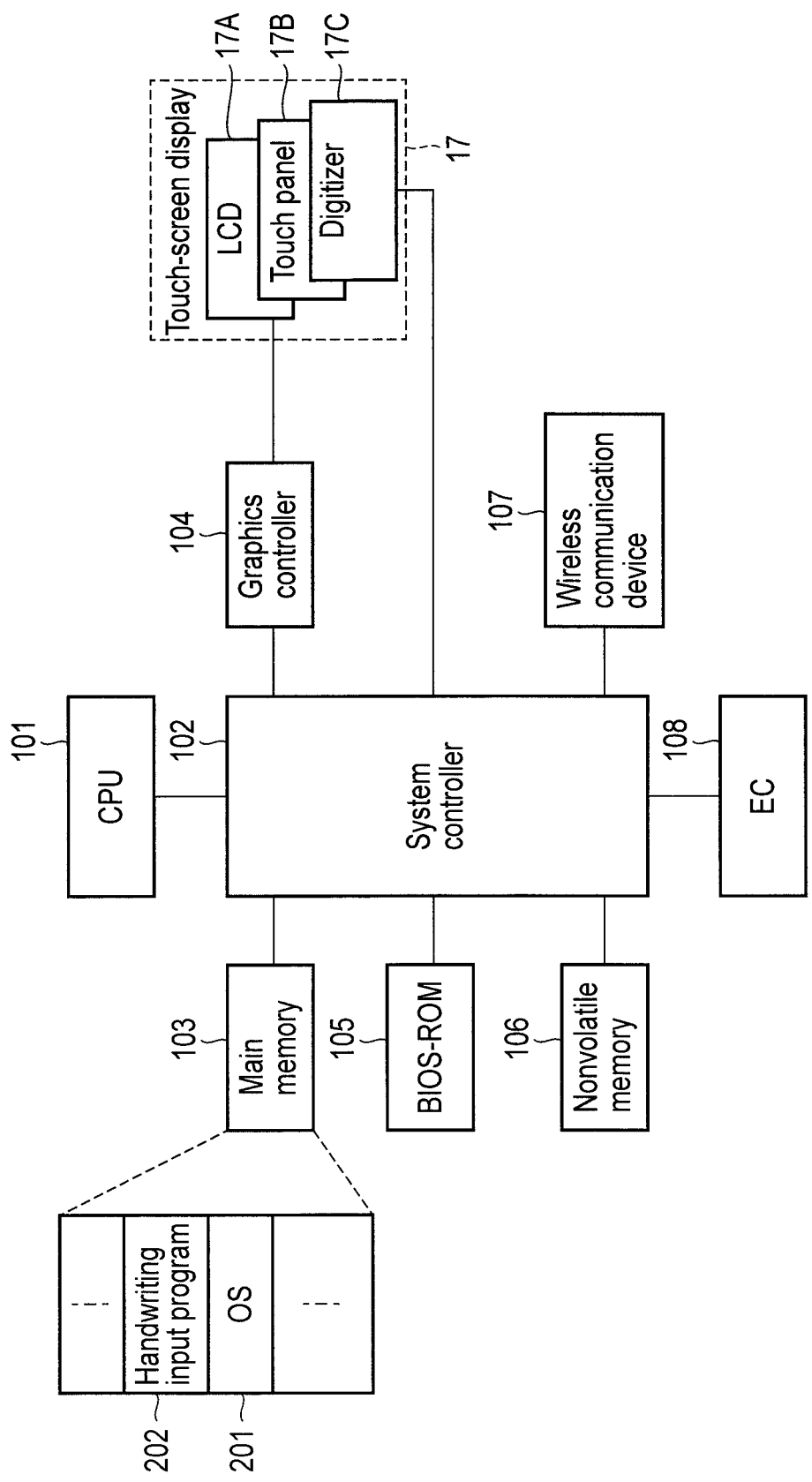
FIG. 2 is an exemplary view illustrating a system configuration of a tablet computer of the embodiment.

FIG. 2 shows a system configuration of the tablet computer 10 in the embodiment.

As shown in FIG. 2, the tablet computer 10 includes a CPU 101, a system controller 102, a main memory 103, a graphics controller 105, a BIOS-ROM 105, a nonvolatile memory 106, a wireless communication device 107, and an embedded controller (EC) 108.

The CPU 101 is a processor which controls the operations of various modules in the tablet computer 10. The CPU 101 executes various programs, which are loaded from the nonvolatile memory 106 into the main memory 103. The programs which are executed by the CPU 101 include an operating system (OS) 201 and various application programs. The application programs include a handwriting input program 202 and a handwritten character recognition program (not shown). By executing the handwriting input program 202, the CPU 101 realizes a function of creating a handwritten document (time-series information), a function of displaying a handwritten document, a function of editing a handwritten document, and a retrieve function of retrieving a handwritten document including a stroke part corresponding to a retrieve key. In addition, by executing the handwritten character recognition program, the CPU 101 can realize a character recognition function of recognizing each of characters included in a handwritten document.

Besides, the CPU 101 executes a basic input/output system (BIOS) which is stored in the BIOS-ROM 105. The BIOS is a program for hardware control.

The system controller 102 is a device which connects a local bus of the CPU 101 and various components. The system controller 102 includes a memory controller which access-controls the main memory 103. In addition, the system controller 102 includes a function of communicating with the graphics controller 104 via, e.g. a serial bus.

The graphics controller 104 is a display controller which controls an LCD 17A that is used as a display monitor of the tablet computer 10. A display signal, which is generated by the graphics controller 104, is sent to the LCD 17A. The LCD 17A displays a screen image based on the display signal. A touch panel 17B and a digitizer 17C are disposed on the LCD 17A as position detection devices. The touch panel 17B is an electrostatic capacitance-type pointing device for executing an input on the screen of the LCD 17A. A contact position on the screen, which is touched by a finger, and a movement of the contact position, are detected by the touch panel 17B. The digitizer 17C is an electromagnetic induction-type pointing device for executing an input on the screen of the LCD 17A. A contact position on the screen, which is touched by the pen 100, and a movement of the contact position, are detected by the digitizer 17C.

The wireless communication device 107 is a device configured to execute wireless communication such as wireless LAN or 3G mobile communication.

The EC 108 is a one-chip microcomputer including an embedded controller for power management. The EC 108 includes a function of powering on or powering off the tablet computer 10 in accordance with an operation of a power button by the user.

Figure 3:
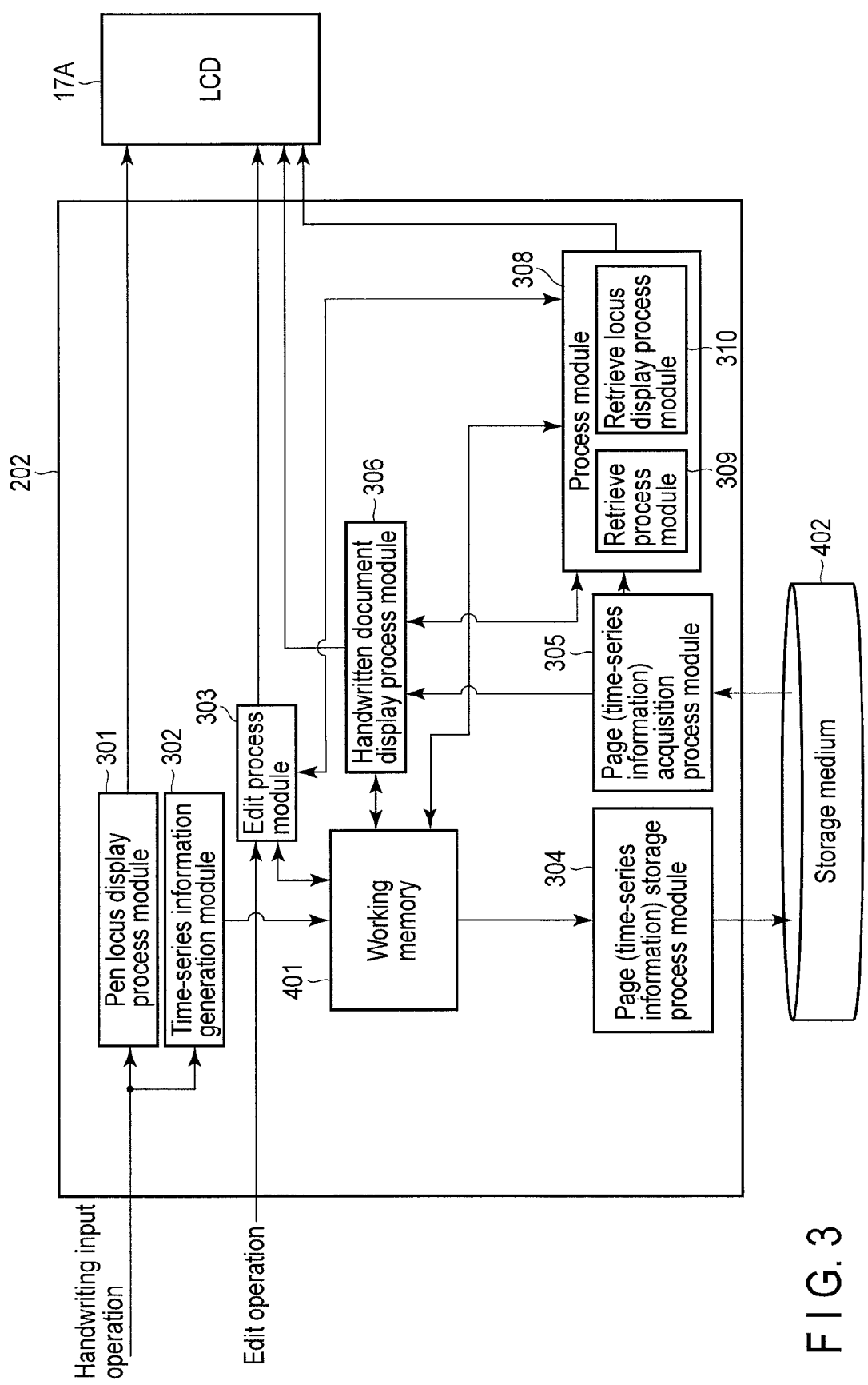
FIG. 3 is an exemplary view illustrating a functional configuration which is realized by a handwriting input program of the embodiment.

Next, referring to FIG. 3, a description is given of a functional configuration which is realized by the handwriting input program 202 in the embodiment.

The handwriting input program 202 can realize functions such as a pen locus display process module 301, a time-series information generation module 302, an edit process module 303, a page storage process module 304, a page acquisition process module 305, a handwritten document display process module 306, and a process module 308.

The handwriting input program 202 executes creation, display and edit of a handwritten document, by using stroke data (coordinate data series) which is input by using the touch-screen display 17. The touch-screen display 17 is configured to detect the occurrence of events such as "touch", "movement (slide)" and "release". The "touch" is an event indicating that an external object has come in contact with the screen. The "move (slide)" is an event indicating that the position of contact of the external object has been moved while the external object is in contact with the screen. The "release" is an event indicating that the external object has been released from the screen.

The pen locus display process module 301 and time-series information generation module 302 receive an event of "touch" or "move (slide)" which is generated by the touch-screen display 17, thereby detecting a handwriting input operation. The "touch" event includes coordinate data indicative of a contact position. The "move (slide)" event also includes coordinate data indicative of a contact position at a destination of movement. Thus, the pen locus display process module 301 and time-series information generation module 302 can receive coordinate data series, which correspond to the locus of movement of the contact position, from the touch-screen display 17.

The pen locus display process module 301 receives coordinate data series from the touch-screen display 17 and displays, based on the coordinate data series, the locus of each stroke, which is handwritten by a handwriting input operation with use of the pen 100 or the like, on the screen of the LCD 17A in the touch-screen display 17. By the pen locus display process module 301, the locus of the pen 100 during a time in which the pen 100 is in contact with the screen, that is, the locus of each stroke, is drawn on the screen of the LCD 17A.

The time-series information generation module 302 receives the above-described coordinate data series which are output from the touch-screen display 17, and generates time-series information, based on the coordinate data series. In this case, the time-series information, that is, the coordinate data and time stamp information corresponding to the respective points of each stroke, may be temporarily stored in a working memory 401.

Further, the time-series information generation module 302 can execute a block-structuring process for the time-series information, and can divide stroke data corresponding to the respective strokes in units of a block. For example, the stroke data is divided in units of a stroke constituting one character (or one symbol, for instance). The time-series information generation module 302 compares a distance between the respective strokes and a preset distance reference value, for example, based on the stroke data (coordinate data series). When the distance between the strokes is longer than the distance reference value, the time-series information generation module 302 sets a boundary between the strokes as a division candidate for dividing strokes of one character. In addition, in the case where the time-series information includes time stamp information, if a time from the input of the last coordinates of one stroke to the input of the first coordinates of the next stroke is longer than a preset reference time, the time-series information generation module 302 sets a boundary between the strokes as a division candidate. Besides, the time-series information generation module 302 may find a division candidate, based on the combination of the distance between strokes and the time of input of each stroke data. The time-series information generation module 302 divides plural stroke data in units of a block, and adds block information indicative of each block to the time-series information.

The page storage process module 304 stores the time-series information, which has been generated by the time-series information generation module 302, as a handwritten document (handwritten page) in a storage medium 402. The storage medium 402, as described above, may be the storage device in the tablet computer 10, a storage device in a personal computer, or a storage device in a server.

The page acquisition process module 305 reads out from the storage medium 402 arbitrary time-series information which is already stored in the storage medium 402. The read-out time-series information is sent to the handwritten document display process module 306.

The handwritten document display process module 306 analyzes the time-series information and displays, based on the analysis result, the locus of each stroke, which is indicated by the time-series information, as a handwritten page. In addition, the handwritten document display process module 306 can display on the screen not only a handwritten page for one page, but also handwritten page thumbnails for a plurality of pages, which are obtained by reducing handwritten pages in size. In accordance with a retrieve result by a retrieve process module 309 of the process module 308, the handwritten document display process module 306 can select, from a plurality of retrieval-target handwritten pages, handwritten pages including locus parts (stroke parts) which correspond to a retrieve key, that is, handwritten pages including loci similar to a handwritten character string or the like which has been designated as a retrieve key, and can display a list of the selected handwritten pages by handwritten page thumbnails.

The edit process module 303 executes a process for editing a handwritten page which is currently being displayed. Specifically, in accordance with an edit operation which is executed by the user on the touch-screen display 17, the edit process module 303 executes an edit process for deleting, moving or adding one or more strokes of a plurality of stokes which are being displayed. Further, the edit process module 303 updates the time-series information which is being displayed, in order to reflect the result of the edit process on the time-series information.

When a menu such as "delete", "move" or "add" has been selected from the edit menu by the user, the edit process module 303 executes a process of delete, move or add on the loci (strokes) which are displayed by the handwritten document display process module 306.

The process module 308 can execute various processes, for example, a retrieve process and a recognition process, on the process-target time-series information. The process module 308 includes a retrieve process module 309 and a retrieve locus display process module 310.

The retrieve process module 309 retrieves a locus part (stroke part) corresponding to a retrieve key (e.g. a handwritten character string) from a plurality of time-series information items (a plurality of handwritten pages) which are stored in the storage medium 402. The retrieve process module 309 can input coordinate data series indicative of a specific character string which is set as a retrieve key by a user operation. For example, the retrieve process module 309 displays on the screen a retrieve key input area for handwriting a character string, graphics, etc., and inputs, as a retrieve key, a character string, graphics, etc. which has been handwritten by the user in the retrieve key input area. Alternatively, the retrieve process module 309 can input, as a retrieve key, loci (strokes) included in a range which has been designated by a user operation on a handwritten page displayed by the handwritten document display process module 306.

The retrieve process module 309 calculates a ratio of coincidence (degree of similarity) between time-series information (coordinate data series) included in a plurality of retrieve-target handwritten pages and time-series information (coordinate data series) corresponding to a retrieve key, and retrieves a time-series information part (stroke part) in the time-series information, the ratio of coincidence (degree of similarity) of which is a reference value or more.

The retrieve locus display process module 310 displays a stroke part corresponding to the time-series information part, which has been retrieved by the retrieve process module 309, on the screen of the LCD 17A in such a display mode that the retrieved stroke part can easily be discriminated from the other strokes. For example, the retrieve locus display process module 310 varies (enlarges or reduces) the display size of an area including strokes corresponding to the retrieved time-series information part, in accordance with the ratio of coincidence (degree of similarity) calculated by the retrieve process module 309. For example, as the ratio of coincidence (degree of similarity) calculated by the retrieve process module 309 becomes higher, the retrieve locus display process module 310 makes larger the display size of the area including the stroke part. Thereby, a handwritten document including the stroke part corresponding to the retrieve key can be surely and easily understood, even from a plurality of handwritten documents (pages). The details of the method of displaying loci (strokes) by the retrieve locus display process module 310 will be described later.

Various methods can be used as the method of calculating the degree of similarity between time-series information (plural handwritten pages) and a retrieve key (handwritten characters). For example, coordinate series of each stroke may be treated as a vector. In this case, in order to calculate the degree of similarity between vectors which are targets of comparison, an inner product between the vectors which are targets of comparison may be calculated as the degree of similarity between the vectors which are targets of comparison. In another example, the locus of each stroke may be treated as an image, and the area of a part, where images of loci of targets of comparison overlap to a highest degree, may be calculated as the above-described degree of similarity. Furthermore, an arbitrary device may be made for reducing the amount of computation processing. Besides, DP (Dynamic Programming) matching may be used as the method of calculating the degree of similarity between handwritten characters.

As has been described above, in the present embodiment, by retrieving the handwritten characters (time-series information part) corresponding to the retrieve key from a plurality of handwritten pages which are already stored, a handwritten page conforming to the user's intention can easily be retrieved from many handwritten pages which were previously created and stored. In the embodiment, since a handwritten character part retrieved from handwritten pages is displayed in a display mode (e.g. enlargement or reduction) which is different from the display mode of the other handwritten character parts, the corresponding handwritten character part can easily be discriminated.

Next, the operation of the tablet computer 10 in the embodiment is described.

Figure 4:
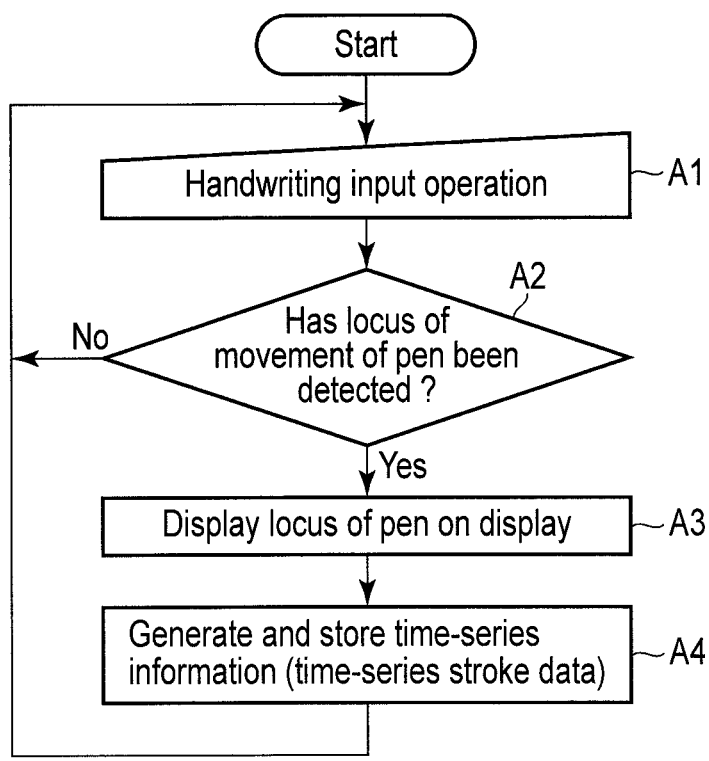
FIG. 4 is an exemplary flowchart illustrating a handwritten page creation process of the embodiment.

To begin with, referring to a flowchart of FIG. 4, a description is given of the procedure of a handwritten page creation process which is executed by the handwriting input program 202.

If the user executes a handwriting input operation on the touch-screen display 17 by using the pen 100 (block A1), the CPU 101 detects the locus of movement of the penpoint of the pen 100 via the digitizer 17C in accordance with an event of "touch" or "move" (Yes in block A2). The pen locus display process module 301 inputs coordinate data series (stroke data) indicative of the locus, and displays strokes corresponding to the coordinate data series on the LCD 17A (block A3). In addition, the time-series information generation module 302 generates time-series information, based on the coordinate data series which is input via the digitizer 17C, and temporarily stores the time-series information in the working memory 401 (main memory 103) (block A4).

FIG. 5 illustrates an example of a retrieve screen 500 which is presented to the user by the handwriting input program 202.

The retrieve screen 500 displays a retrieve key input area 501, a retrieve button 501A and a clear button 501B. The retrieve key input area 501 is an area for inputting a retrieve key that is to be set as a retrieve target. In the retrieve key input area 501, a character string or graphics can be input by handwriting by the user. In addition, via a software keyboard which is displayed on the touch-screen display 17 by the OS 201 (or an application), character codes can be input as a retrieve key in accordance with a user operation on the software keyboard, and character fonts corresponding to the character codes can be displayed on the retrieve key input area 501. The retrieve button 501A is a button for instructing execution of a retrieve process. The clear button 501B is a button for instructing deletion (clear) of a retrieve key (handwritten character string, graphics, etc.) which was input in the retrieve key input area 501.

A plurality of handwritten page thumbnails 601 are displayed on the retrieve screen 500. In the example of FIG. 5, nine handwritten page thumbnails 601 corresponding to nine handwritten pages are displayed. On the retrieve screen 500, if a retrieve key is input in the retrieve key input area 501 and a retrieve process is executed by the retrieve button 501A, loci (strokes) corresponding to the retrieve key in the handwritten page thumbnails 601 are displayed in a display mode different from the display mode of the other loci (strokes).

Next, referring to flowcharts of FIG. 6 and FIG. 7, a description is given of the retrieve process by the retrieve function of the tablet computer 10.

It is assumed that the handwritten document display process module 306 displays, on one screen, handwritten page thumbnails, which have been obtained by reducing handwritten pages, for instance, handwritten page thumbnails of nine pages. When the execution of the retrieve process has been instructed by the user, the retrieve process module 309 sets the retrieve key input area 501 in the screen, and displays the retrieve screen 500 as shown in FIG. 5.

When a character string, which is a retrieve key, has been input to the retrieve key input area 501 by handwriting by the user, the retrieve process module 309 inputs time-series information (coordinate data series) indicative of the handwritten input character string (strokes) via the time-series information generation module 302 (block B1).

If the user selects the retrieve button 501A to instruct the execution of the retrieve (Yes in block B2), the retrieve process module 309 retrieves a stroke part corresponding to the retrieve key from handwritten document pages (e.g. handwritten document pages displayed on the retrieve screen 500) (block B3). Specifically, the retrieve process module 309 retrieves a time-series information part, which corresponds to the time-series information (coordinate data series) representative of the character string that was input by handwriting as the retrieve key, from the time-series information of handwritten document pages which are retrieve targets (block B3). For example, the retrieve process module 309 extracts from the handwritten document pages the time-series information part (stroke part) corresponding to the time-series information of the retrieve key, and calculates the ratio of coincidence (degree of similarity) between the extracted time-series information part and the time-series information of the retrieve key.

When the ratio of coincidence is higher than a preset reference value, the retrieve process module 309 determines that the time-series information part (stroke part) extracted from the handwritten document pages corresponds to the retrieve key (Yes in block B4). When the locus part (stroke part) corresponding to the retrieve key has been retrieved, the retrieve process module 309 temporarily stores in the working memory 401 the ratio of coincidence (degree of similarity) together with the time-series information part corresponding to the retrieved locus part.

The retrieve process module 309 executes the above-described process with respect to all strokes (time-series information parts) included in the handwritten document pages that are retrieve targets (blocks B3 to B5), and retrieves the stroke part (time-series information part) corresponding to the retrieve key.

If the process for all handwritten document pages that are retrieve targets is completed (Yes in block B6), the retrieve locus display process module 310 extracts strokes (time-series information part) in a predetermined range, which precede and follow the retrieved stroke part in time series (block B7). Specifically, the retrieve locus display process module 310 discriminates strokes which are displayed in continuity with the stroke part retrieved by the retrieve key in the handwritten document pages.

For example, the retrieve locus display process module 310 extracts a predetermined number of strokes (e.g. 10 strokes) which were input by handwriting before and after the stroke corresponding to the retrieved stroke part. For instance, when a handwritten character string is horizontally arranged, strokes which are displayed on the right and left of the retrieved stroke part are extracted. When a handwritten character string is vertically arranged, strokes which are displayed above and below the retrieved stroke part are extracted.

Alternatively, based on the coordinate data series of the retrieved stroke part (time-series information part), a circumscribed rectangle is set for the stroke part, and strokes (time-series information parts), which are present in predetermined ranges before and after this circumscribed rectangle, may be extracted. In the meantime, it is possible to extract not only the loci (strokes) which are present in predetermined ranges before and after this circumscribed rectangle, but also strokes near the stroke part (circumscribed rectangle) corresponding to the retrieve key, for instance, strokes (time-series information parts) existing in predetermined ranges on the left and right of, and above and below, the locus part in the screen. Besides, the predetermined range may be a range which is obtained by enlarging by a predetermined magnification (e.g. 2.0 times) the circumscribed rectangle that is set for the stroke part.

In the case where a block-structuring process was executed for time-series information and the time-series information was divided into stroke groups each constituting, for example, one character, it is possible to extract time-series information parts (e.g. time-series information parts for two characters) corresponding to a predetermined number of blocks (corresponding to a number of characters).

In the case where a character recognition process was executed for each stroke group divided by the block-structuring process and thereby a character recognition result (character code) corresponding to each block was obtained, it is possible to divide a character code string (character string data) into words by subjecting the character code string to a syntax analysis process, and to extract loci (e.g. loci of one word) corresponding to a predetermined number of words.

In the meantime, based on other conditions, other loci (time-series information) of a range, which is close to the locus part (stroke part) retrieved based on the retrieve key, may be acquired.

Next, based on the ratio of coincidence calculated for the retrieved stroke part, the retrieve locus display process module 310 calculates the display position and size of a display area for displaying the stroke part (retrieve result) retrieved based on the retrieve key, in the handwritten document pages (block B8).

The retrieve locus display process module 310 sets the circumscribed rectangle, for example, based on the coordinate data series corresponding to the retrieved stroke part, and finds a display area of the retrieve result by enlarging or reducing this circumscribed rectangle at a magnification corresponding to the ratio of coincidence.

For example, by setting a higher magnification for a locus part with a higher ratio of coincidence, the size of the display area of the retrieve result is made larger than the original display size of the stroke part displayed in the handwritten document page. Thereby, the stroke part with a higher ratio of coincidence with the retrieve key can be displayed more conspicuously in the handwritten document page.

Although a locus part was retrieved as being similar to the retrieve key (with a ratio of coincidence higher than a reference value), there is a case that the ratio of coincidence of this locus part is low. In this case, by setting a low magnification, it is possible to display this locus part (stroke part) less conspicuously than the stroke part with a high ratio of coincidence. Incidentally, by setting the magnification to be less than 1.0, the locus part (stroke part) can be displayed with a display size that is smaller than the original display size of the stroke part displayed in the handwritten document page.

The display position of the display area may be set, for example, such that the gravity position of the display area of the retrieve result coincides with the gravity position of the circumscribed rectangle that is set for the stroke part, with reference to the position of display of the retrieved stroke part, or such that the display area of the retrieve result does not overlap the circumscribed rectangle.

After executing the process of blocks B7 and B8 for all stroke parts (time-series information parts) retrieved from the handwritten document pages, the retrieve locus display process module 310 displays a screen of handwritten document pages which are the retrieve results (block B9). In the handwritten document pages which are the retrieve results, the display areas of the retrieve results are displayed in a display mode different from the display mode of the other area, for example, in a highlight display mode. By highlight-displaying the retrieved locus parts, the stroke parts corresponding to the retrieve key can easily be discriminated from the other strokes.

Figure 8:
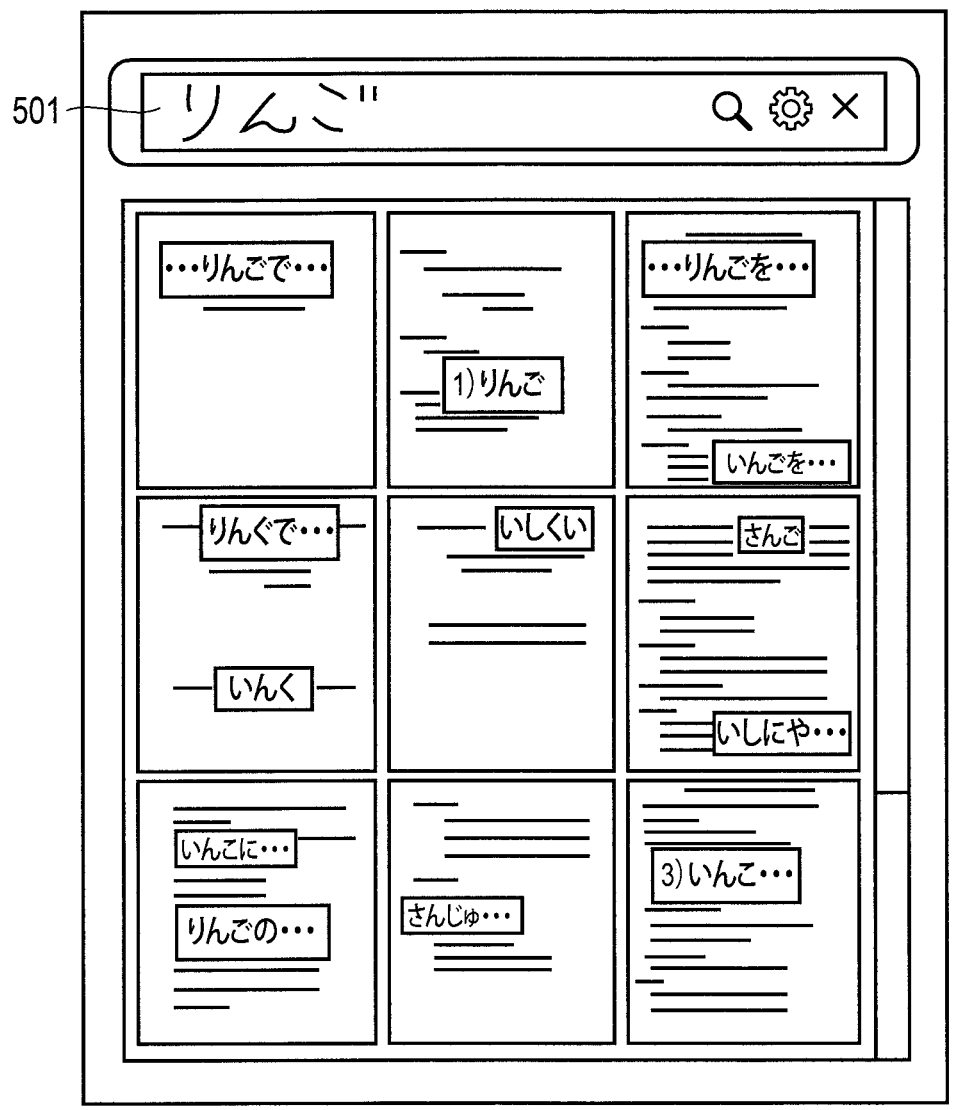
FIG. 8 is a view illustrating an example in which handwritten document pages are displayed in the embodiment.

FIG. 8 illustrates an example in which handwritten document pages, which is retrieve results, are displayed on the retrieve screen 500 in the embodiment.

In FIG. 8, handwritten characters were input in the retrieve key input area 501, and retrieval for the input character string was executed. As a result, stroke parts, which were determined to correspond to the retrieve key, were retrieved from nine pages. The stroke parts are displayed in display areas, the sizes of which were varied in accordance with the ratios of coincidence of the stroke parts.

FIG. 9 is a view illustrating an example of one handwritten document page displayed on the retrieve screen 500 in the embodiment.

The handwritten document page shown in FIG. 9 includes handwritten character strings (loci) A1 to A6 which are similar to the character string (retrieve key) which was input by handwriting in the retrieve key input area 501 shown in FIG. 8.

Figure 10:
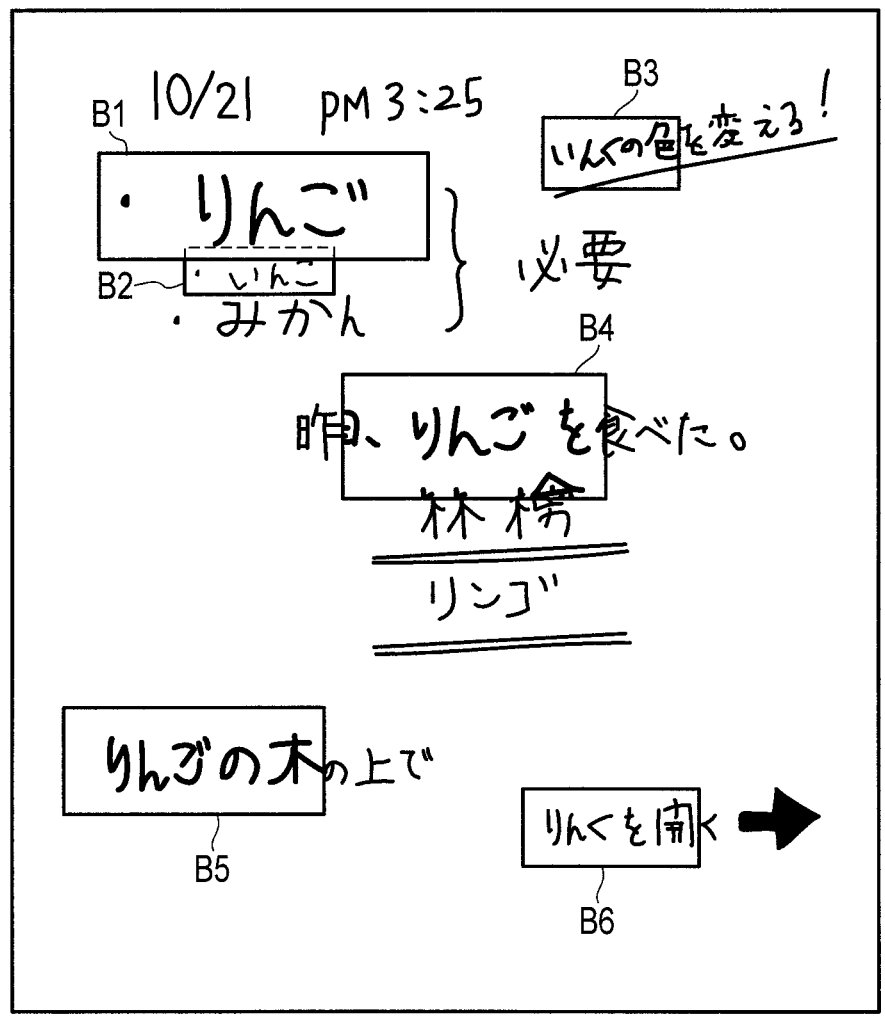
FIG. 10 is a view illustrating a display example of retrieve results for a handwritten document page in the embodiment.

FIG. 10 is a view illustrating a display example of retrieve results for the handwritten document page shown in FIG. 9.

Display areas B1 to B6 of the retrieve results shown in FIG. 10 correspond to the handwritten character strings (stroke parts) A1 to A6 shown in FIG. 9. As shown in FIG. 10, the display sizes of the display areas B1 to B6 including stroke parts corresponding to the retrieve key have been varied, and highlight display is effected.

For example, the handwritten character strings (loci) A1 and A2 shown in FIG. 9 are displayed with substantially the same size. However, the display size of the display area B1, which corresponds to the handwritten character string A1, is different from the display size of the display area B2, which corresponds to the handwritten character string A2. Specifically, the display area B1 is displayed with a large size since the handwritten character string A1 has a high degree of coincidence with the retrieve key. The display area B2 is displayed with a small size since the handwritten character string A2 has a low degree of coincidence (not lower than a reference value) with the retrieve key. Therefore, based on the difference in size between the display areas B1 and B2, the locus part (handwritten character string A1), which is closer to the retrieve key, can easily be discriminated.

In addition, the display areas B1 to B6 of the retrieve results display not only the stroke parts corresponding to the retrieve key, but also nearby strokes of the stroke parts. In the example illustrated in FIG. 10, the stroke parts and the strokes included in the ranges, which are set by enlarging the circumscribed rectangles set for the stroke parts by the predetermined magnification (e.g. 2.0 times), are displayed in the display areas B1 to B6.

Figure 11A:
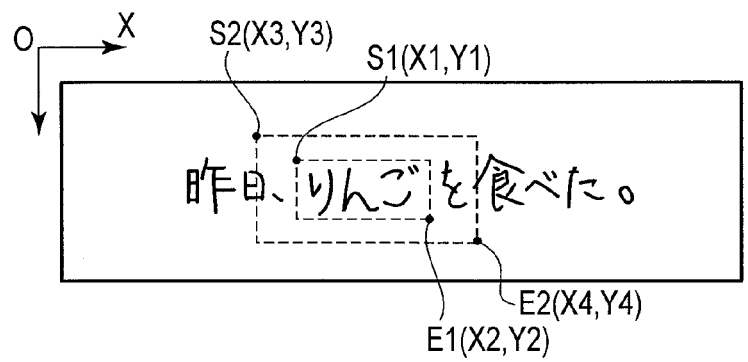
FIG. 11A and FIG. 11B are view illustrating a concrete example in which a stroke part and nearby strokes thereof are displayed in the embodiment.
Figure 11B:
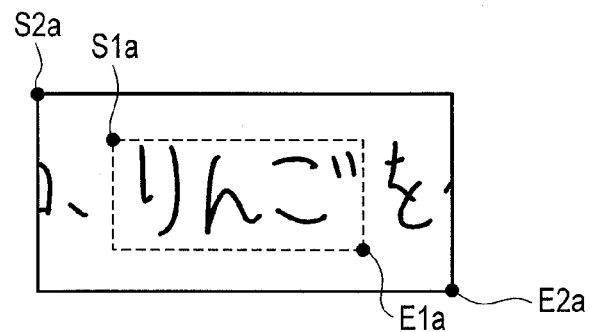

FIG. 11A and FIG. 11B illustrate a concrete example in which a stroke part and nearby strokes of the stroke part are displayed.

FIG. 11A is a view illustrating nearby strokes of the handwritten character string A4 shown in FIG. 9. As shown in FIG. 11A, a circumscribed rectangle S1E1, which is defined by coordinate positions S1(X1,Y1) and E1(X2,Y2), is set for the handwritten character string A4 corresponding to the retrieve key. The coordinate positions S1 and E1 are indicative of two diagonal points of the circumscribed rectangle S1E1.

If the circumscribed rectangle S1E1 is magnified 2.0 times, a rectangular frame S2E2 is obtained. The rectangular frame S2E2 is defined by coordinate positions S2(X3, Y3) and E2(X4, Y4).

In this case, as illustrated in FIG. 11B, the retrieve locus display process module 310 enlarges the display area including the stroke part and the nearby strokes existing in the rectangular frame S2E2, in accordance with the ratio of coincidence. The display size of the display area B4 is defined by coordinate positions S2a and E2a.

In this manner, in the display areas B1 to B6 of the retrieve results, the stroke part corresponding to the retrieve key and the nearby loci (strokes) thereof are displayed. Thereby, in consideration of the context, it can be quickly determined whether the stroke part corresponds to the character string designated as the retrieve key.

Figure 12A:
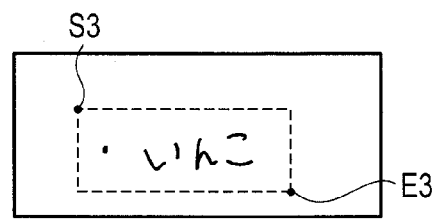
FIG. 12A and FIG. 12B are view for explaining setting of a display area corresponding to a handwritten character string in the embodiment.
Figure 12B:
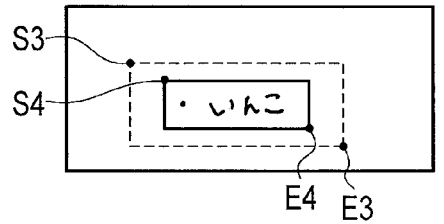

FIG. 12A and FIG. 12B are views for explaining the setting of the display area B2 which corresponds to the handwritten character string A2 shown in FIG. 9. FIG. 13A and FIG. 13B are views for explaining the setting of the display area B5 which corresponds to the handwritten character string A5 shown in FIG. 9.

FIG. 12A shows a rectangular frame S3E3 which is set by magnifying 2.0 times the circumscribed rectangle of the handwritten character string A2. Since the handwritten character string A2 has a low ratio of coincidence with the retrieve key, the magnification corresponding to the ratio of coincidence is set at less than 1.0. Accordingly, as illustrated in FIG. 12B, the size of the display area B2, relative to the rectangular frame S3E3, is defined by coordinate positions S4 and E4, and is smaller than the original display size of the stroke part displayed in the handwritten document page.

FIG. 13A shows a rectangular frame S5E5 which is set by magnifying 2.0 times the circumscribed rectangle of the handwritten character string A5. Since the handwritten character string A5 has a higher ratio of coincidence with the retrieve key than the handwritten character string A2, the magnification corresponding to the ratio of coincidence is set at 1.0 or more. Accordingly, as illustrated in FIG. 13B, the size of the display area B5, relative to the rectangular frame S5E5, is defined by coordinate positions S6 and E6, and is larger than the original display size of the stroke part displayed in the handwritten document page.

When the display size of the strokes shown in FIG. 12A and the display size shown in FIG. 13A are compared, the display size of the loci (strokes) shown in FIG. 12A is larger. However, when the handwritten character string A5 has a higher ratio of coincidence with the retrieve key than the handwritten character string A2, the size of the display area B5 shown in FIG. 13B becomes larger than the size of the display area B2 shown in FIG. 12B, by varying the size of the display area of the retrieve result in accordance with the ratio of coincidence with the retrieve key. Therefore, based on the display sizes of the display areas A2 and A5 of the retrieve result, it can be easily discriminated which of the stroke parts is similar to the character string of the retrieve key.

FIG. 14 is a view illustrating examples of the display areas B1 and B2.

As described above, the size of the display area (stroke part) is varied in accordance with the ratio of coincidence of the handwritten character string A1, A2 with the retrieve key. As a result, as shown in FIG. 14, there may be a case in which a plurality of display areas overlaps.

The retrieve locus display process module 310 corrects the display mode of the display area by a retrieve result display process illustrated in the flowchart of FIG. 7.

The retrieve locus display process module 310 determines whether display areas (rectangular frames) of retrieve results corresponding to a plurality of locus parts, which have been retrieved from handwritten document pages, overlap or not, based on coordinates which define the positions of the display areas (block C1).

When there are overlapping display areas, the retrieve locus display process module 310 compares the ratios of coincidence with the retrieve key of the handwritten character strings (stroke parts) corresponding to the respective overlapping display areas (block C2).

Then, the retrieve locus display process module 310 displays the display areas corresponding to the handwritten character strings, in the order of handwritten character strings beginning with one with the highest ratio of coincidence. Specifically, as shown in FIG. 14, the entirety of the display area B1, which corresponds to the handwritten character string A1 with the highest ratio of coincidence, is displayed, and the display area B2, which corresponds to the handwritten character string A2 with a lower ratio of coincidence, is displayed such that the display area B2 is (partly) hidden by the display area B1. Thereby, on the handwritten document page, a stroke part with a high ratio of coincidence with the retrieve key can be confirmed with priority.

In the meantime, if the display area B2, which is displayed such that it is hidden by the display area B1, is selected by pointing using, e.g. the pen 100, the retrieve locus display process module 310 changes the display so as to display the entirety of the display area B2 in place of the display area B1, responding to the instruction to select the display area B2. Specifically, the retrieve locus display process module 310 displays the entirety of the display area B2, and displays the display area B1 such that it is (partly) hidden by the display area B2.

Thereby, even in the case where the display positions of the plural display areas B1 and B2 overlap, the stroke parts displayed in the display areas B1 and B2 can easily be confirmed by a simple operation. In this manner, in the tablet computer 10 of the embodiment, by inputting the handwritten character string that is the retrieve key, stroke parts corresponding to the retrieve key are retrieved from the strokes in handwritten document pages, and the retrieved stroke parts are varied in size in accordance with the ratio of coincidence with the retrieve key and is highlight-displayed. Thus, even when a plurality of handwritten document pages are displayed on one screen, a stroke part among a plurality of retrieved stroke parts, which has a higher degree of similarity to the retrieve key, can easily be discriminated. In addition, the display area, which displays the retrieved stroke part, displays nearby strokes (e.g. preceding and following strokes) of the retrieved stroke part, as well as the retrieved stroke part itself. Thus, taking into account the context of the handwritten character string represented by the strokes, the retrieve result that is needed by the user can quickly and easily be discriminated.

In the above description, the display area of the retrieve result is defined by a rectangle. Alternatively, a display area of a shape, other than the rectangle, may be set. In addition, the shape of the display area can be varied in accordance with the ratio of coincidence corresponding to the locus part displayed in the display area. For example, when the ratio of coincidence with the retrieve key, which corresponds to the stroke part, exceeds a reference value for determining the shape of the display area, the shape of the display area including the stroke part is made different from the shape of other display areas, so that the display area including the stroke part may be displayed more conspicuously in the handwritten document page.

In addition, in the above description, the display area of the retrieve result is highlight-displayed. Alternatively, a display mode other than highlight display can be used. For example, the display color of the stroke part which is displayed in the display area, or the background color of the stroke part in the display area, can be made different from the color of other display areas. Besides, the display color of the stroke part or the background may be varied in accordance with the ratio of coincidence which corresponds to the stroke part. For example, a more conspicuous gradation may be applied to a display area which displays a stroke part with a higher ratio of coincidence. Alternatively, when the ratio of coincidence which corresponds to the stroke part exceeds a reference value for determining the display color, the stroke part is displayed with a color different from the color of other display areas, so that only the stroke part with a high ratio of coincidence, among a plurality of stroke parts retrieved by the retrieve key, may be displayed more conspicuously.

In the retrieve process illustrated in the flowchart of FIG. 6, display areas are set for all stroke parts retrieved by the retrieve key, and the display areas are varied in size in accordance with the ratio of coincidence and are displayed. Alternatively, the retrieve results may be display in other display modes. For example, the display areas of all stroke parts retrieved by the retrieve key are displayed in a display mode (e.g. highlight display) different from the display mode of the other area, with the display size of the display areas in the handwritten document page being unchanged. When a display area has been pointed by a user operation (e.g. an instruction to select a display area), the display area is varied in size in accordance with the ratio of coincidence of the stroke part with the retrieve key, and the display area with the varied size is displayed. A retrieve process using this display mode is described with reference to a flowchart of FIG. 15.

Figure 15:
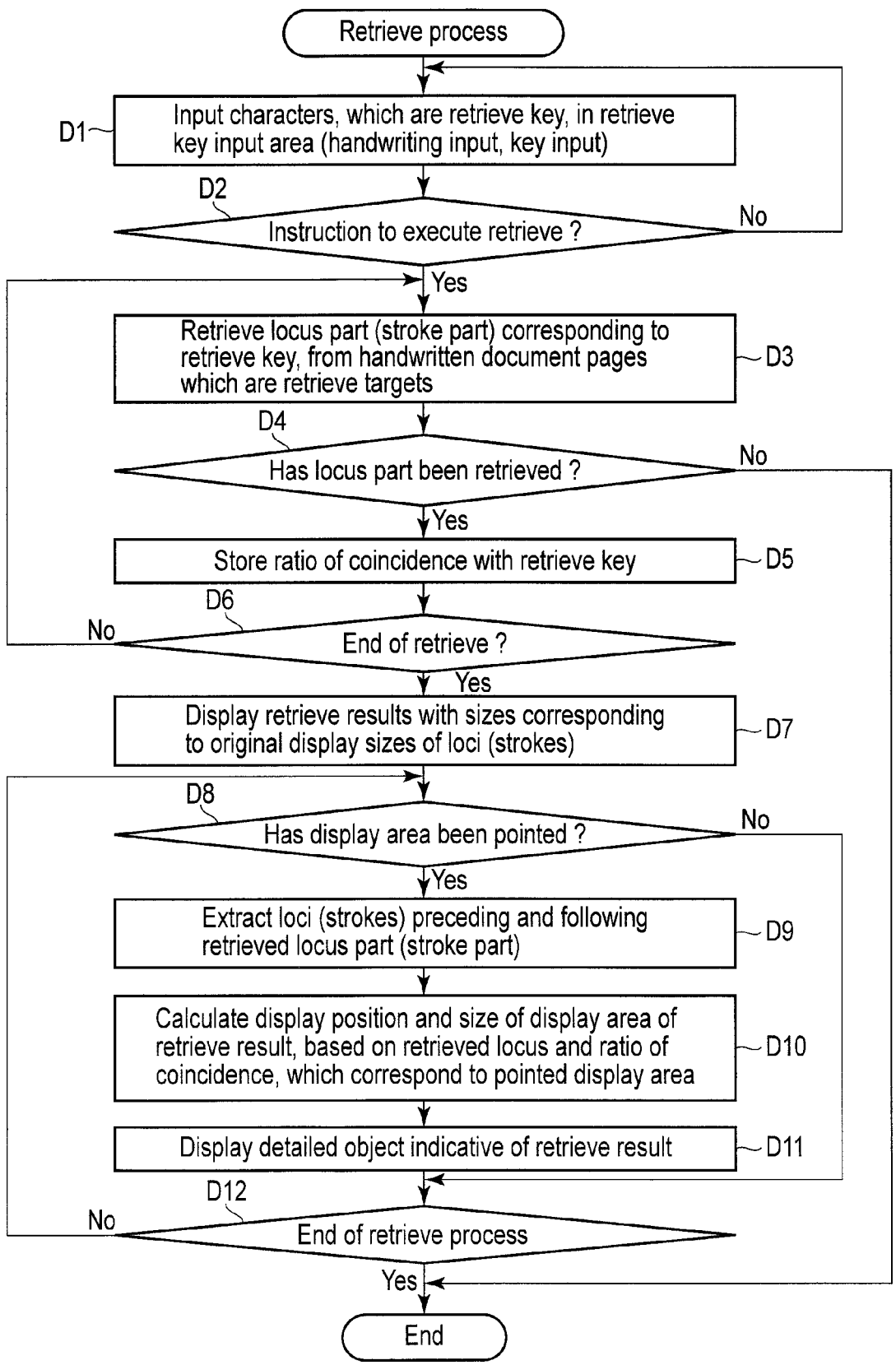
FIG. 15 is an exemplary flowchart illustrating a retrieve process of the embodiment.

The process of blocks D1 to D6 illustrated in FIG. 15 are similar to the process of blocks B1 to B6 in the flowchart shown in FIG. 6, so a detailed description thereof is omitted.

If the process for all handwritten document pages that are retrieve targets is completed (Yes in block D6), the retrieve locus display process module 310 displays retrieve results with sizes corresponding to the original display sizes of strokes displayed on the handwritten document pages (block D7). For example, the retrieve locus display process module 310 sets display areas for the stroke parts corresponding to the retrieve key in the handwritten document pages, and displays the display areas in a display mode such as a highlight display mode. The size of the display area may be the same as the size of the circumscribed rectangle of the stroke part, or may be a size calculated by magnifying the circumscribed rectangle with a predetermined magnification (e.g. 2 times) (the display size of strokes is unchanged).

When a display area (stroke part) has been pointed by a user operation using the pen 100, the retrieve locus display process module 310 extracts strokes in predetermined ranges preceding and following the pointed display area (stroke part) (block D9), and calculates the size and display position of the display area of the retrieve result in accordance with the ratio of coincidence corresponding to the stroke part (block D10).

Then, the retrieve locus display process module 310 displays the display area of the retrieve result as a detailed object indicative of the retrieve result (block D11). The detailed object may be displayed only while the display area is being pointed by the pen 100, or may be displayed only for a predetermined time (e.g. 5 seconds) since the display object was pointed by the pen 100. The format of the detailed object is not limited. Use may be made of formats generally called "popup display", "window display" or "message label display".

Figure 16A:
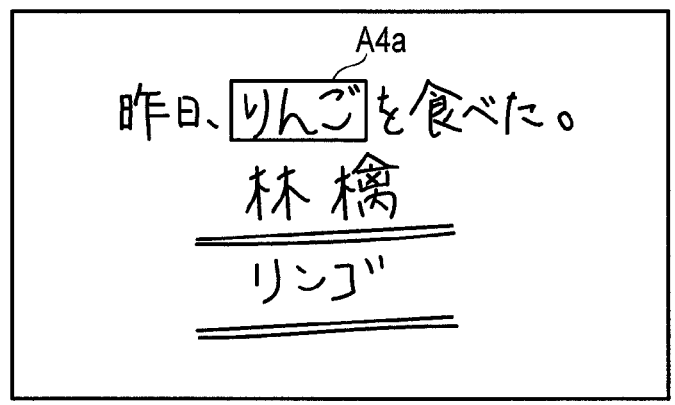
FIG. 16A and FIG. 16B are view illustrating a display example of a display area in the embodiment.
Figure 16B:
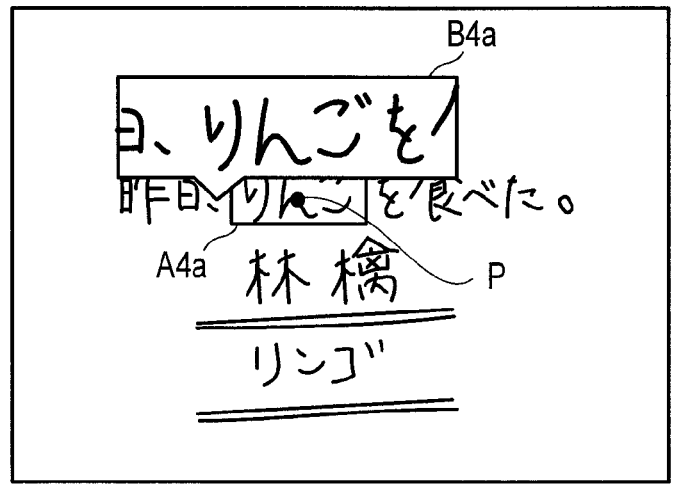

FIG. 16A shows a display area A4a which is set for the stroke part A4 retrieved by the retrieve key. As illustrated in FIG. 16B, when a point P in the display area A4a has been pointed by the pen 100, the retrieve locus display process module 310 displays a display area B4a of the retrieve result. As shown in FIG. 16B, in the display area B4a, the retrieved stroke part is displayed such that it is enlarged in accordance with the ratio of coincidence.

If the termination of the retrieve process is instructed (Yes in block D12), the retrieve locus display process module 310 cancels the display areas of the retrieve results, and restores the display to the original display state of the handwritten document pages.

In this manner, the user can confirm the details (stroke part) of the retrieve result by arbitrarily pointing, with use of the pen 100, the highlight-displayed stroke part (display area) in the plural handwritten document pages displayed on the retrieve screen 500.

Figure 17:
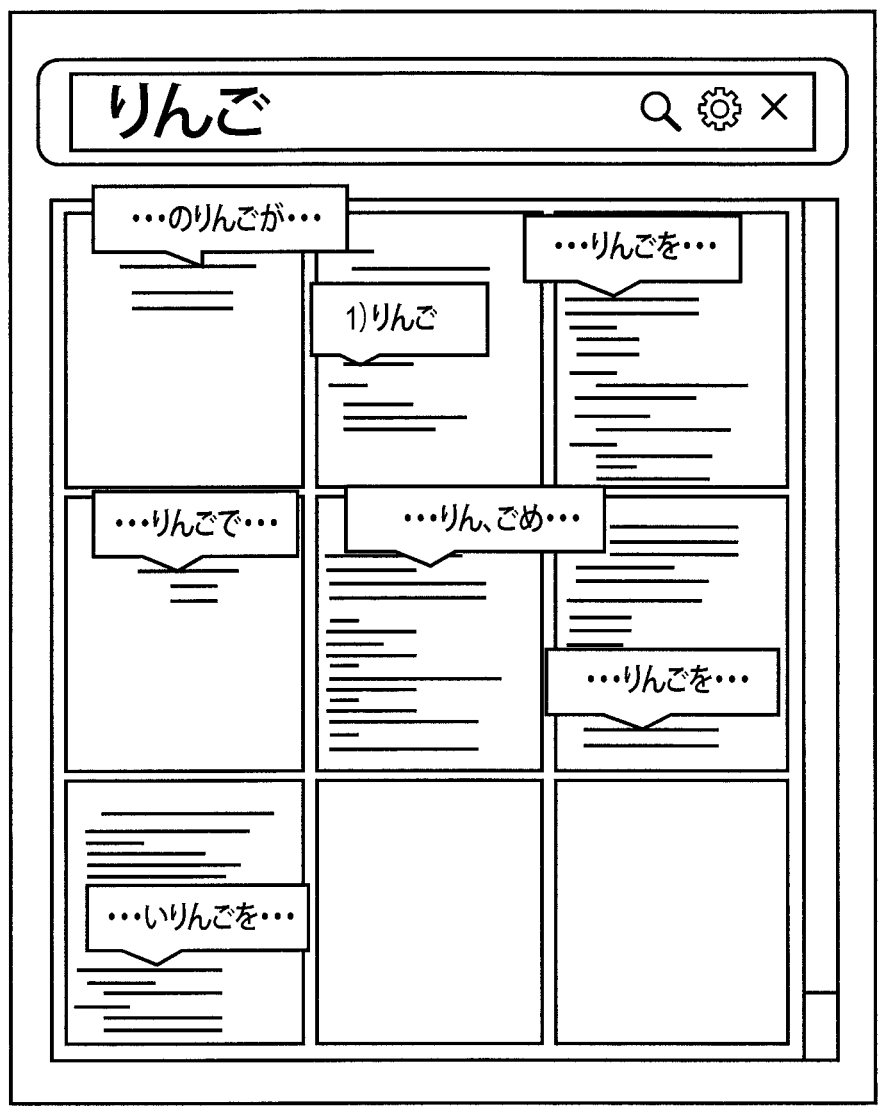
FIG. 17 is a view illustrating an example of a retrieve screen according to another display mode in the embodiment.
Figure 18:
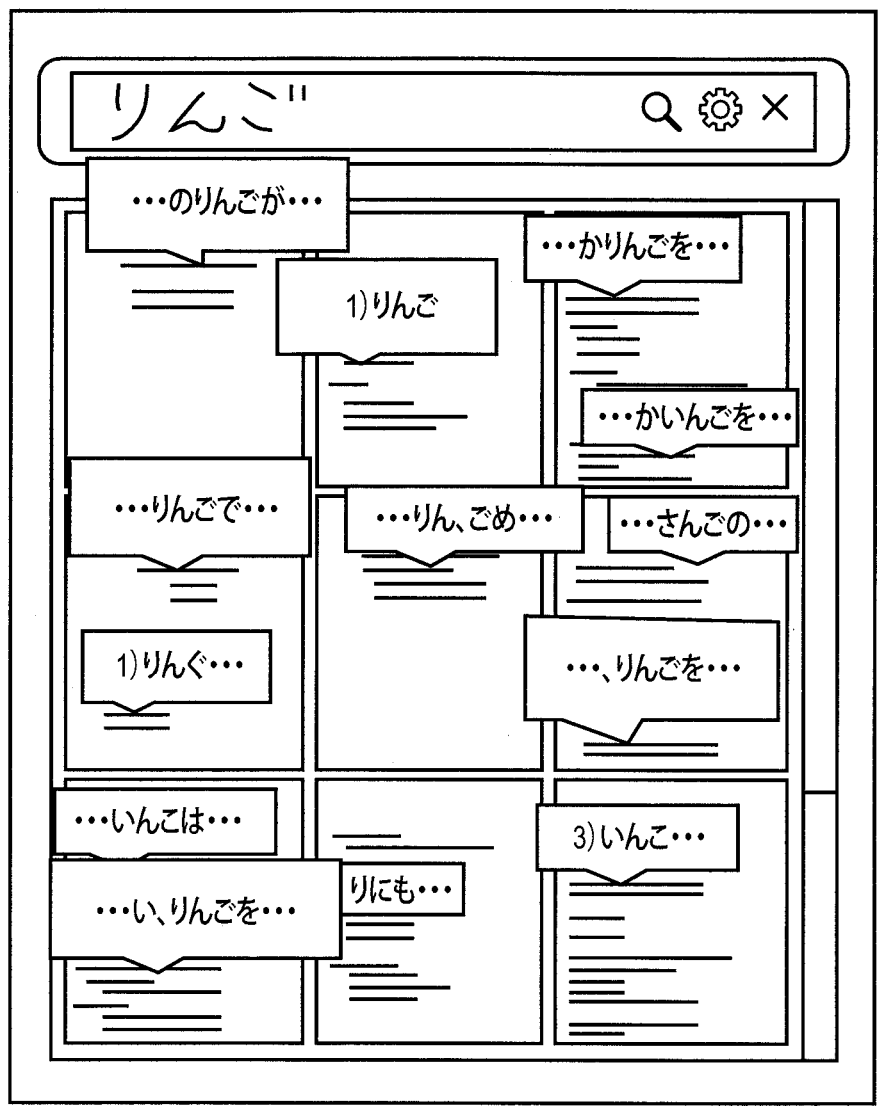
FIG. 18 is a view illustrating an example of a retrieve screen according to another display mode in the embodiment.

FIG. 17 and FIG. 18 illustrate examples of the retrieve screen 500 in other display modes.

In the example shown in FIG. 17, instead of a handwritten character string, a character string which is input by using, for example, a software keyboard, is input in the retrieve key input area 501.

As regards handwritten document pages that are retrieve targets, it is assumed that a block-structuring process was executed on time-series information, a character recognition process was executed on each block of one character, and a recognition result (character code string) by the character recognition process is stored. In addition, a character code included in the recognition result is associated with each block (strokes of one character) corresponding to this character code.

Using as a retrieve key the character string which was input in the retrieve key input area 501, the retrieve process module 309 retrieves corresponding character code strings from the recognition results (character code strings) by the character recognition process.

When the corresponding character code strings have been retrieved, the retrieve locus display process module 310 sets display areas, for example, as shown in FIG. 17, for strokes (locus parts) of respective blocks corresponding to the character code strings, and displays the strokes (locus parts) as retrieve results.

In the example illustrated in FIG. 17, the display areas of plural retrieve results have the same size (a size larger than the original display size of loci). Each of the display areas displays the stroke part retrieved by the retrieve key, and nearby (preceding and following) strokes of this stroke part. In addition, each display area does not have a rectangular shape, but a balloon shape.

In the example illustrated in FIG. 18, the shape of display areas of retrieve results is a balloon shape, and the sizes of the respective display areas are varied in accordance with the ratios of coincidence. In addition, overlapping display areas are displayed such that the entirety of a display area (a display area with the largest size), which displays a stroke part with a highest ratio of coincidence with the retrieve key, is displayed, and a part of a display area, which displays a stroke part with a low ratio of coincidence with the retrieve key, is hidden.

Also in the case of the display modes illustrated in FIG. 17 and FIG. 18, when a display area has been pointed by a user operation, this display area may be varied in size and displayed, as described with reference to the flowchart of FIG. 15.

In the above description, the data of handwritten input strokes is stored as time-series information (stroke information). However, this data may be stored as image data, or with other data structures representing strokes.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The process that has been described in connection with the present embodiment may be stored as a computer-executable program in a recording medium such as a magnetic disk (e.g. a flexible disk, a hard disk), an optical disk (e.g. a CD-ROM, a DVD) or a semiconductor memory, and may be provided to various apparatuses. The program may be transmitted via communication media and provided to various apparatuses. The computer reads the program that is stored in the recording medium or receives the program via the communication media. The operation of the apparatus is controlled by the program, thereby executing the above-described process.

What is claimed is:

1. An electronic device comprising:
a storage configured to store information representing a plurality of strokes;
a screen capable of displaying the plurality of strokes, based on the information; and
a hardware processor configured to:
input a retrieve key for retrieval of the plurality of strokes;
display an enlarged or reduced display area including a stroke part, which is retrieved from the information and corresponds to the retrieve key, and strokes other than the stroke part on the screen;
change a first display mode of the stroke part, wherein the first display mode is different from a second display mode of the strokes other than the stroke part;
receive a user operation to select the stroke part; and
change a style of the stroke part if the stroke part is selected.

2. The electronic device of claim 1, wherein the hardware processor is configured to display the display area in a first mode and an area other than the display area in a second mode different from the first mode on the screen.

3. The electronic device of claim 1, wherein the hardware processor is configured to display the display area including nearby strokes of the stroke part on the screen.

4. The electronic device of claim 1, wherein the hardware processor is configured to change a size of the stroke part in accordance with a ratio of coincidence between the retrieve key and the stroke part.

5. The electronic device of claim 1, wherein:
a first area including at least a first stroke part corresponding to the retrieve key and a second area including at least a second stroke part corresponding to the retrieve key overlap each other; and
the hardware processor is configured to display an entirety of the second area on the screen, if the second area is selected.

6. A handwritten document display method comprising:
storing information representing a plurality of strokes;
displaying the plurality of strokes on a screen, based on the information;
inputting a retrieve key for retrieval of the plurality of strokes;
displaying an enlarged or reduced display area including a stroke part, which is retrieved from the information and corresponds to the retrieve key and strokes other than the stroke part on the screen;
changing a first display mode of the stroke part, wherein the first display mode is different from a second display mode of the strokes other than the stroke part;

receiving a user operation to select the stroke part; and
changing a style of the stroke part if the stroke part is selected.

7. An electronic device comprising:
a storage configured to store information representing a plurality of strokes;
a screen capable of displaying the plurality of strokes, based on the information; and
a hardware processor configured to:
input a retrieve key for retrieval of the plurality of strokes; and
display an enlarged or reduced display area including a stroke part, which is retrieved from the stroke information and corresponds to the retrieve key, and strokes other than the stroke part on the screen, wherein:
a first area including at least a first stroke part corresponding to the retrieve key and a second area including at least a second stroke part corresponding to the retrieve key overlap each other; and
the hardware processor is configured to display an entirety of the first area on the screen, if the first stroke part has a higher ratio of coincidence with the retrieve key than the second stroke part.

8. The electronic device of claim 7, wherein the hardware processor is configured to display the display area in a first mode and an area other than the display area in a second mode different from the first mode on the screen.

9. The electronic device of claim 7, wherein the hardware processor is configured to display the display area including nearby strokes of the stroke part on the screen.

10. The electronic device of claim 7, wherein the hardware processor is configured to change a size of the stroke part in accordance with a ratio of coincidence between the retrieve key and the stroke part.

11. The electronic device of claim 7, wherein the hardware processor is configured to display an entirety of the second area on the screen, if the second area is selected.

12. An electronic device comprising:
a storage configured to store information representing a plurality of strokes;
a screen capable of displaying the plurality of strokes, based on the information; and
a hardware processor configured to:
input a retrieve key for retrieval of the plurality of strokes;
display an enlarged or reduced display area including a first stroke corresponding to the retrieve key and strokes near the first stroke on the screen, if the retrieve key is input; and
display a plurality of display areas on the screen, if a plurality of first strokes corresponding to the retrieve key are retrieved, each of the plurality of display areas including at least one first stroke, wherein:
an enlargement ratio or a reduction ratio of each of the plurality of display areas is variable based on the first stroke included in each of the plurality of display areas; and
a shape of each of the plurality of display areas comprises a shape same as a shape of each of areas, each of which is obtained by enlarging each of rectangular areas defined based on the first stroke included in each of the plurality of display areas.

13. A handwritten document display method comprising:
storing information representing a plurality of strokes;
displaying the plurality of strokes on a screen, based on the information;
inputting a retrieve key for retrieval of the plurality of strokes;
displaying an enlarged or reduced display area including a first stroke corresponding to the retrieve key and strokes near the first stroke on a screen, if the retrieve key is input; and
displaying a plurality of display areas on the screen, if a plurality of first strokes corresponding to the retrieve key are retrieved, each of the plurality of display areas including at least one first stroke, wherein:
an enlargement ratio or a reduction ratio of each of the plurality of display areas is variable based on the first stroke included in each of the plurality of display areas; and
a shape of each of the plurality of display areas comprises a shape same as a shape of each of areas, each of which is obtained by enlarging each of rectangular areas defined based on the first stroke included in each of the plurality of display areas.

* * * * *